(12) United States Patent
Seshadrinathan et al.

(10) Patent No.: US 8,745,052 B2
(45) Date of Patent: Jun. 3, 2014

(54) SYSTEM AND METHOD FOR ADDING CONTEXT TO THE CREATION AND REVISION OF ARTIFACTS

(75) Inventors: Manoj Seshadrinathan, Chicago, IL (US); Kelly L. Dempski, Evanston, IL (US)

(73) Assignee: Accenture Global Services Limited, Dublin (IE)

( * ) Notice: Subject to any disclaimer, the term of this patent is extended or adjusted under 35 U.S.C. 154(b) by 791 days.

(21) Appl. No.: 12/233,288

(22) Filed: Sep. 18, 2008

(65) Prior Publication Data
US 2010/0095298 A1  Apr. 15, 2010

(51) Int. Cl.
G06F 7/00      (2006.01)
G06F 17/30     (2006.01)
G06F 17/24     (2006.01)

(52) U.S. Cl.
CPC .................................. *G06F 17/246* (2013.01)
USPC ........................................................ 707/736

(58) Field of Classification Search
None
See application file for complete search history.

(56) References Cited

U.S. PATENT DOCUMENTS

| | | | |
|---|---|---|---|
| 5,671,428 A * | 9/1997 | Muranaga et al. | 715/751 |
| 6,341,291 B1 * | 1/2002 | Bentley et al. | 1/1 |
| 6,519,763 B1 | 2/2003 | Kaufer et al. | |
| 6,604,110 B1 | 8/2003 | Savage et al. | |
| 6,720,967 B1 * | 4/2004 | Cox et al. | 345/440 |
| 7,162,466 B2 | 1/2007 | Kaasten et al. | |
| 7,188,316 B2 | 3/2007 | Gusmorino et al. | |
| 2002/0002567 A1 * | 1/2002 | Kanie et al. | 707/513 |
| 2002/0167543 A1 * | 11/2002 | Smith et al. | 345/762 |
| 2003/0014409 A1 | 1/2003 | Shukoor | |
| 2003/0135565 A1 | 7/2003 | Estrada | |
| 2003/0204536 A1 | 10/2003 | Keskar et al. | |
| 2003/0220891 A1 * | 11/2003 | Fish | 707/1 |
| 2004/0119713 A1 * | 6/2004 | Meyringer | 345/440 |
| 2004/0139104 A1 * | 7/2004 | Kuntz-Mayr et al. | 707/103 R |
| 2004/0215690 A1 | 10/2004 | O'Keeffe | |
| 2005/0010504 A1 * | 1/2005 | Gebhard et al. | 705/34 |
| 2005/0018827 A1 * | 1/2005 | Himmel et al. | 379/202.01 |
| 2005/0021553 A1 | 1/2005 | Romijn et al. | |
| 2005/0091339 A1 | 4/2005 | Rudolph | |
| 2005/0222971 A1 * | 10/2005 | Cary | 707/1 |
| 2006/0041689 A1 | 2/2006 | Fujita et al. | |
| 2006/0080432 A1 | 4/2006 | Spataro et al. | |

(Continued)

OTHER PUBLICATIONS

Object Database Support for a Software Project Management Environment, by Liu et al, Proceedings of the third ACM SIGSOFT/SIGPLAN software engineering symposium on Practical software development environments, New York, NY, 1988.*

(Continued)

*Primary Examiner* — Jay Morrison
(74) *Attorney, Agent, or Firm* — Mannava & Kang, P.C.

(57) ABSTRACT

A system includes a process-related-data handling component operative to handle process-related data corresponding to an operation associated with an artifact, such as the creation or revision of the artifact. An application component is operatively coupled to the process-related-data handling module and is operative to interact with the artifact. A storage element is also operatively coupled to the process-related-data handling module and is operative to store the process-related data. The process-related data may be displayed, created, or otherwise manipulated through a data management tool, which may include, a calendar interface, a task interface, and/or a media capture module. A method is also directed towards establishing process-related context concerning at least one artifact.

33 Claims, 6 Drawing Sheets

(56) References Cited

U.S. PATENT DOCUMENTS

| | | |
|---|---|---|
| 2006/0136357 A1 | 6/2006 | Rasmussen |
| 2006/0143104 A1* | 6/2006 | Wagonheim ............... 705/35 |
| 2006/0212492 A1* | 9/2006 | Jacobs et al. ............. 707/202 |
| 2007/0027917 A1 | 2/2007 | Ariel |
| 2007/0067772 A1 | 3/2007 | Bustamante |
| 2007/0143660 A1 | 6/2007 | Huey et al. |
| 2007/0150612 A1 | 6/2007 | Chaney et al. |
| 2007/0185832 A1 | 8/2007 | Kriebel |
| 2007/0220025 A1 | 9/2007 | Hyman |
| 2007/0220063 A1 | 9/2007 | O'Farrell et al. |
| 2007/0233535 A1* | 10/2007 | Kim ................................. 705/7 |
| 2007/0255631 A1 | 11/2007 | Schmidt et al. |
| 2008/0016193 A1 | 1/2008 | Allen et al. |
| 2008/0037047 A1 | 2/2008 | Condon et al. |
| 2008/0046834 A1 | 2/2008 | Yu et al. |
| 2008/0059539 A1 | 3/2008 | Chin |
| 2008/0077888 A1 | 3/2008 | Muksovsky |
| 2008/0082925 A1* | 4/2008 | Brush et al. ................ 715/744 |
| 2008/0157969 A1* | 7/2008 | Beringer ................. 340/572.1 |
| 2008/0222510 A1* | 9/2008 | Nguyen et al. ............. 715/212 |
| 2008/0242319 A1* | 10/2008 | Paschetto et al. .......... 455/456.6 |
| 2009/0293074 A1* | 11/2009 | Rohwer ..................... 719/328 |
| 2010/0030578 A1* | 2/2010 | Siddique et al. ............... 705/3 |

OTHER PUBLICATIONS

U.S. Appl. No. 61/024,973, filed on Jan. 31, 2008.*
Word 2007 for Dummies, Dan Gookin, Dec. 26, 2006, Wiley Publishing, pp. 11-24 and 331-338.*
Office 2007: Top 100 Simplified® Tips & Tricks, by Kate Shoup, Publisher: Visual, Publication Date: Dec. 17, 2007, Print ISBN: 978-0-470-11870-2.*
"A Hierarchical File System Interface to Database-based Content Management Application", Ivan Voros, Kristijan Zimmer, Mario Zagar, University of Zagreb, 2006.

* cited by examiner

SYSTEM AND METHOD FOR ADDING CONTEXT TO THE CREATION AND REVISION OF ARTIFACTS

FIELD OF THE DISCLOSURE

This disclosure generally relates to facilitating collaboration, and more particularly to collaboration efforts in relation to work being performed on one or more computer systems.

BACKGROUND OF THE DISCLOSURE

Advances in technology and software have increased the reliance that both individuals and businesses have on computer-implemented solutions for performing common tasks, such as creating documents in word processing applications, creating spreadsheets in spreadsheet applications, creating presentations in presentation applications, and utilizing applications for any other suitable reason. A user uses any one of various software applications (e.g., word processing application, text editor, spreadsheet application, presentation application, code editor, integrated development environment ("IDE")) to generate an artifact (e.g., documents, diagrams, spreadsheets, code files, slides, or any other output file used to store information) based on a user's input. Each artifact is often revised multiple times until the user is ultimately satisfied with the final artifact.

While many artifacts are created by one individual, artifacts are also commonly generated in a collaborative environment, and as such, an artifact may be revised multiple times by different people who are separated by both time and distance. For example, most large scale software development projects are distributed across teams located in different geographic locations and in different time zones. In such projects, the communication between teams remains largely asynchronous, and as such, concurrent discussion, editing, and other tools cannot be used to enhance collaboration.

One known solution that enhances collaboration between individuals is commonly referred to as "tracking changes." When an application tracks changes, the application stores history data associated with every change that a user makes to an original document. In a word processing document, for example, history data is stored within an artifact that describes what new text a user adds, what text a user deletes, formatting changes, user comments, or any other information that describes the actual changes the user makes to the artifact.

Multiple problems exist with the known solution of tracking changes, however. For example, the known methods for displaying the history data do not adequately exhibit the changes over time but instead only show that changes were made. Furthermore, the history data does not capture the context and process in which the artifact was captured or revised, so a user reviewing history data is left guessing why another user, or perhaps the user him or herself, made the changes indicated in the history data.

For these reasons, among others, a need exists for improved systems and methods for enhancing the development of and collaboration for artifacts created by software applications.

SUMMARY OF THE DISCLOSURE

A system includes a process-related-data handling component operative to handle process-related data corresponding to an operation associated with an artifact, such as the creation or revision of the artifact. An application component is operatively coupled to the process-related-data handling module and is operative to interact with the artifact. A storage element is also operatively coupled to the process-related-data handling module and is operative to store the process-related data. The system may also include a management component operative to retrieve at least a portion of the process-related data from either a storage element or another application.

In one embodiment, the system further includes a display operatively coupled to the management component, wherein the management component is operative to output display data for displaying, on the display, a process-related data management tool.

In a processing device implementing one or more artifact processing applications and having a graphical user interface including a display and at least one user input device, a method for establishing process-related context concerning at least one artifact includes displaying, on the display, an artifact. Furthermore, a calendar interface is displayed that includes a plurality of date indicators including a highlighted date indicator of the plurality of date indicators based on the existence of process-related data associated with the artifact and a date corresponding to the highlighted date indicator. Via a user input device, selection input is received that corresponds to the highlighted date indicator. In response thereto, data corresponding to at least some of the process-related data associated with the artifact and the date corresponding to the highlighted data indicator is displayed on the display.

In another example, the method further includes receiving the process-related data from a storage element upon invocation of the artifact.

In another example, the method further includes receiving change data for the artifact via the at least one user input device, storing the change data on a storage element as associated with a current date to provide updated process-related data, and then re-displaying the calendar interface based on the updated process-related data.

In one example, the method includes selecting at least some of the process-related data based on a selected portion of the artifact, such as a cell, a paragraph, a slide, or any other suitable divisible portion of an artifact.

In another example, the method further includes displaying data corresponding to at least some of the process-related data further includes displaying a history for the artifact up to the date.

In one embodiment, a task interface is displayed having a list of tasks associated with a selected portion of the artifact. Via at least one input device, input may be received that corresponds to at least one task in the list of tasks. The process-related data may then be updated based on the input.

In yet another example, the method includes displaying a media capture interface and receiving, via the at least one input device, input associated with the artifact. The process-related data is then updated based on this input.

In yet another example embodiment, change data is received for the artifact via the at least one user input device. In response thereto, updated process-related data is provided, based on the change data, to a second application. The second application may be associated with a second artifact, or it may not be associated with the same artifact, or it may not have any association with any artifacts (in the case, for example of a newsreader collecting various newsfeeds).

Using these techniques for capturing, maintaining, displaying, and/or sharing process-related data, a greater and more efficient understanding of the process and context leading to the current state of an artifact may be developed.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
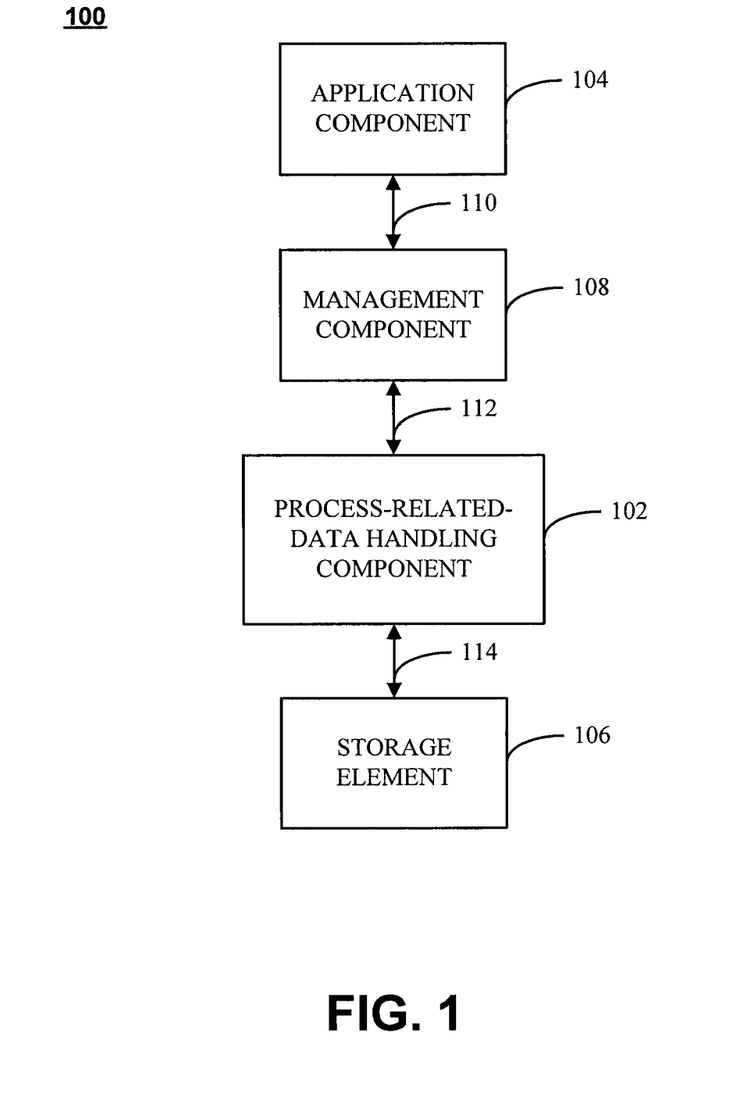
FIG. 1 is a block diagram illustrating a system for capturing the context and process in which an artifact is created or revised.

FIG. 1 shows a system 100 for capturing the context and process in which an artifact is created or revised. System 100 captures data across complex workflows, thereby enhancing coordination and efficiency in a collaborative environment. The system 100 includes a process-related-data handling component 102 operatively coupled to both an application component 104 and a storage element 106. A management component 108 is also operatively coupled to the application component 104 and the process-related-data handling component 102.

Figure 2:
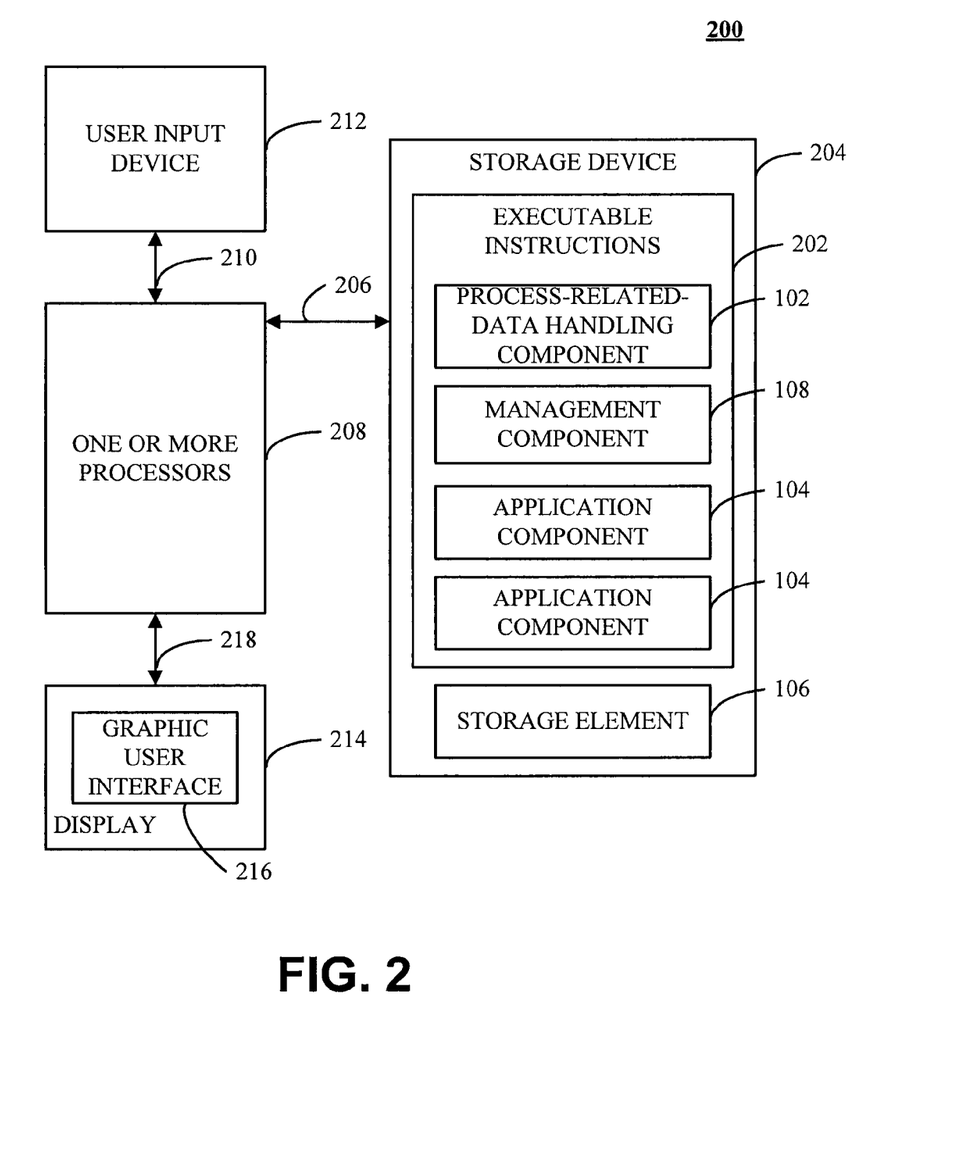
FIG. 2 is a block diagram illustrating a processing device that may be used to implement the system of FIG. 1.

As shown in FIG. 2, the system 100 may be, at least in part, implemented using the device 200 as the stored executable instructions 202 stored on a storage device 204. The stored executable instructions may be passed as storage data 206 to one or more processors 208 and executed thereby, thus causing the desired functionality described herein. The processor(s) 208 may comprise one or more central processing units (CPUs), distributed processing circuitry, application specific integrate circuits (ASICs), state machines, discrete logic, or any other suitable processing circuitry known in the art or any combination thereof. It is further understood that system 100 may not be implemented as stored executable instructions 202 but may instead be implemented in distributed processing circuitry, ASICs, state machines, discrete logic, or any other suitable processing circuitry. The storage device 102 may be any type of storage device conventionally known in the art, such as random access memory (RAM), read-only memory (ROM), programmable memory (PROM), erasable PROMs (EPROM), electrically erasable PROM (EEPROM), flash memory, magnetic storage devices (e.g., hard disks, floppy disks, magnetic tape), optical disc drives, or any other suitable non-volatile memory now known or later developed.

Turning back to FIG. 1, the application component 104 may be any suitable application for creating an artifact. Common examples of an application component 104 include a word processing application, a spreadsheet application, a presentation application, or any other suitable application for the creation or revision of artifacts. The application component 104 is operative to interact with the artifact. For example, the application may produce/create an artifact, view an artifact, edit/modify an artifact, extract information from an artifact, or perform any other suitable operation known in the art, typically in response to user inputs.

The application component 104 is operatively coupled to the process-related-data handling component 102. In this example, the application component is operatively connected to the process-related-data handling component 102 via the connection 110, the management component 108, and the connection 112. The application component 104 is operative to both provide and receive process-related data, to and from the process-related-data handling component 102, corresponding to an operation associated with an artifact. Unlike history data, which track changes features require, process-related data relates to the context and process in which an artifact was created or revised. For example, team members often utilize email to collaborate on projects. The content of the email messages may describe desired changes for an artifact or outline the specifications for a new artifact. If a user views the artifact, however, the user may not be able to readily determine why the artifact was created or revised. History data may help the user determine what was revised, but history data will not show process-related data, i.e., data describing the context and reasoning behind the changes.

The process-related-data handling component 102 is also operatively coupled to the storage element 106 that is operative to store the process-related data, which may pass between the process-related-data handling module 102 and the storage element 106 via the connection 114. The storage element 106 may be any suitable storage element, such as random access memory (RAM), read-only memory (ROM), programmable memory (PROM), erasable PROMs (EPROM), electrically erasable PROM (EEPROM), flash memory, magnetic storage devices (e.g., hard disks, floppy disks, magnetic tape), optical disc drives, or any other suitable non-volatile memory now known or later developed. In one example, the connection 114 is over a network, such as a wired or wireless network, and storage element 106 may include storage programming (not shown) that organizes and indexes the process-related data for retrieval. As one example, storage element 106 may be a Microsoft Office SharePoint Server. One advantage of using Microsoft Office SharePoint Server is that the storage programming is known and already built into the server.

The management component 108 is operatively coupled to the application component 104 and the process-related-data handling component 102. The management component 108 interfaces with the application component 104 and is operative to retrieve at least a portion of the process related data from the storage element 106 and/or the application component 104. The management component 108 may retrieve the process-related data from an application 104, provide process-related data to an application 104, provide process-related data to the process-related-data handling component 102 for storage in a storage element 106, and retrieve process-related data from the process-related-data handling component 102.

After retrieving at least a portion of the process-related data from the storage element 106, the management component 108 is further operative to send at least a portion of the retrieved process related data to the application component 104. As further discussed below, a display, not shown in FIG. 1, may be operatively coupled to the management component 108 and may be operative to output display data for displaying a process-related data management tool 308 on the display, as discussed below. The process-related data management tool 308 provides a graphical representation of data on a display that displays information relating to at least a portion of the process-related data. The process-related data management tool 308 may further provide a user the ability to provide user input for associating portions of an artifact or operations associated with an artifact with the process-related data. In other words, the process-related data management tool 308 allows users to interact (e.g., see, review, create, modify, delete, etc.) process-related data associated with an artifact.

For example, a process-related data management tool 308 may include a calendar interface, a task tool, or a multimedia capture module, all of which are discussed in more detail below. The process-related-data handling component 102 is also operative to receive the portion of the process-related data from the management component and is further operative to provide the portion of the process-related data to a second application component (not shown). The operation of the system 100 will be better understood with reference to the further description below.

The management component 108 interacts with the application component 104 via any suitable programming means. In one example, the application component 104 contains an application programming interface (API) through which the management component 108 retrieves process-related data and/or history data from the application that is associated with an artifact or presents process-related data and/or history data to the application from any of (i) a process-related-data handling component 102, (ii) a storage element 106, (iii) another application component 104, or (iv) any other suitable source.

Turning now to FIG. 2, the processing device 200 implements one or more artifact processing applications 104 (e.g., a word processing application, spreadsheet application, presentation application, etc.). In the illustrated embodiment, the storage device 204 comprises executable instructions 202 and the storage element 106, including, but not limited to, executable instructions for implementing the process-related data handling component 102, the application component(s) 104, and/or the management component 108, as noted above. It is further understood that the storage element 106 may be implemented using a separate storage device 204, or viewed from a different perspective, the storage device 204 may be distributed, potentially through use of one or more intervening communication networks (e.g., a public communication network such as the Internet or World Wide Web, private communication network such as a local area or wide area network, or combination thereof). The one or more processors 208 are operatively coupled to the storage device 204. User input data 210 (which may include user inputs relevant to operations performed by an application on an artifact or the operation of a graphical user interface) is also communicated between the one or more processors 208 and at least one user input device 212, such as a keyboard, mouse, microphone, touch screen, etc. Processing device 200 also includes a display 214, having a graphical user interface 216, which is operative to display data 218 provided by the processor(s) 208. It is understood that the processing device 200 may be distributed or may have any additional suitable components (e.g., network or peripheral interfaces, etc., not shown) in any suitable location.

Figure 3:
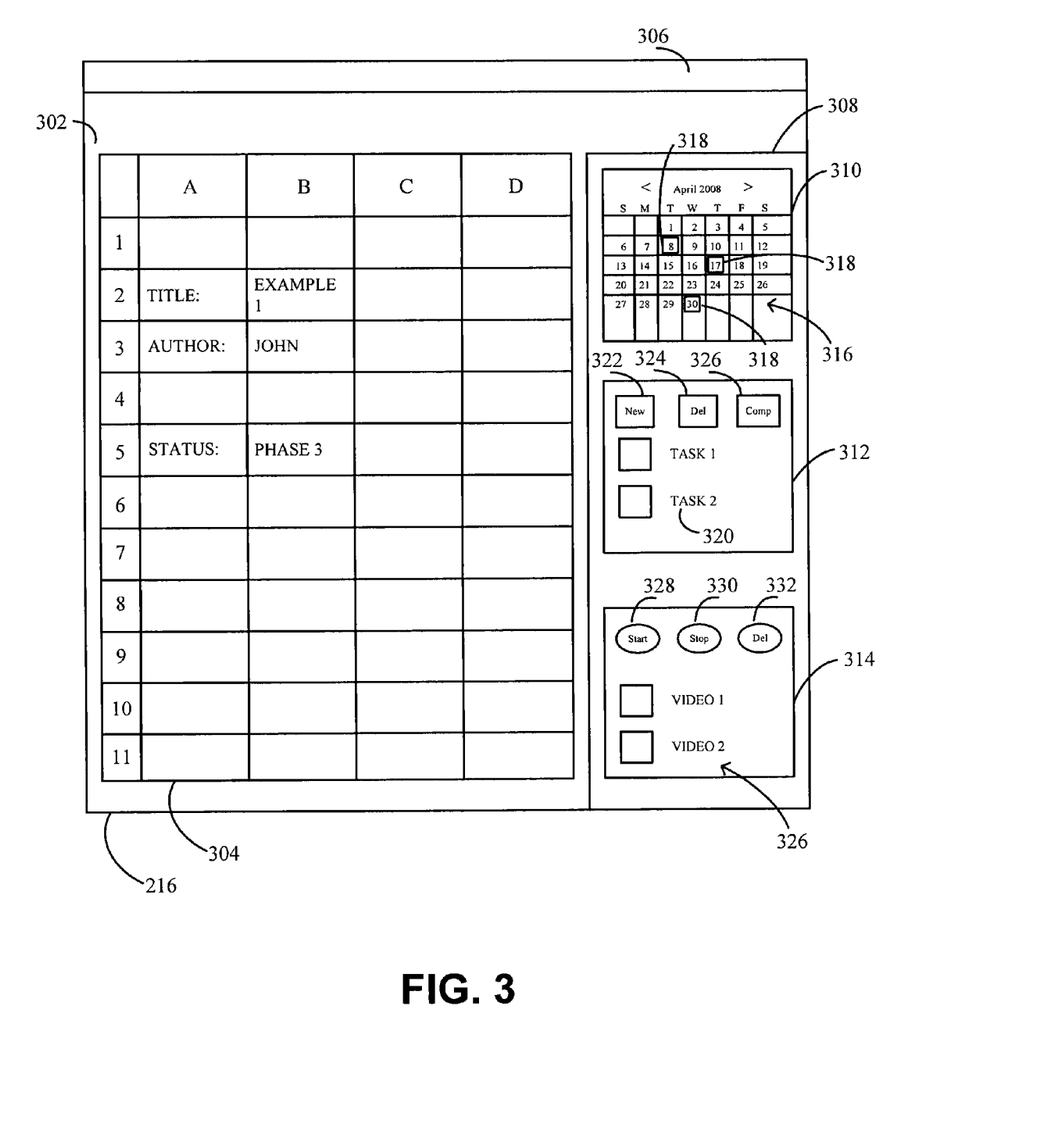
FIG. 3 is a block diagram illustrating an example of a display showing a graphical user interface having an instance of an application with an artifact displayed therein and a process-related data management tool.
Figure 4:
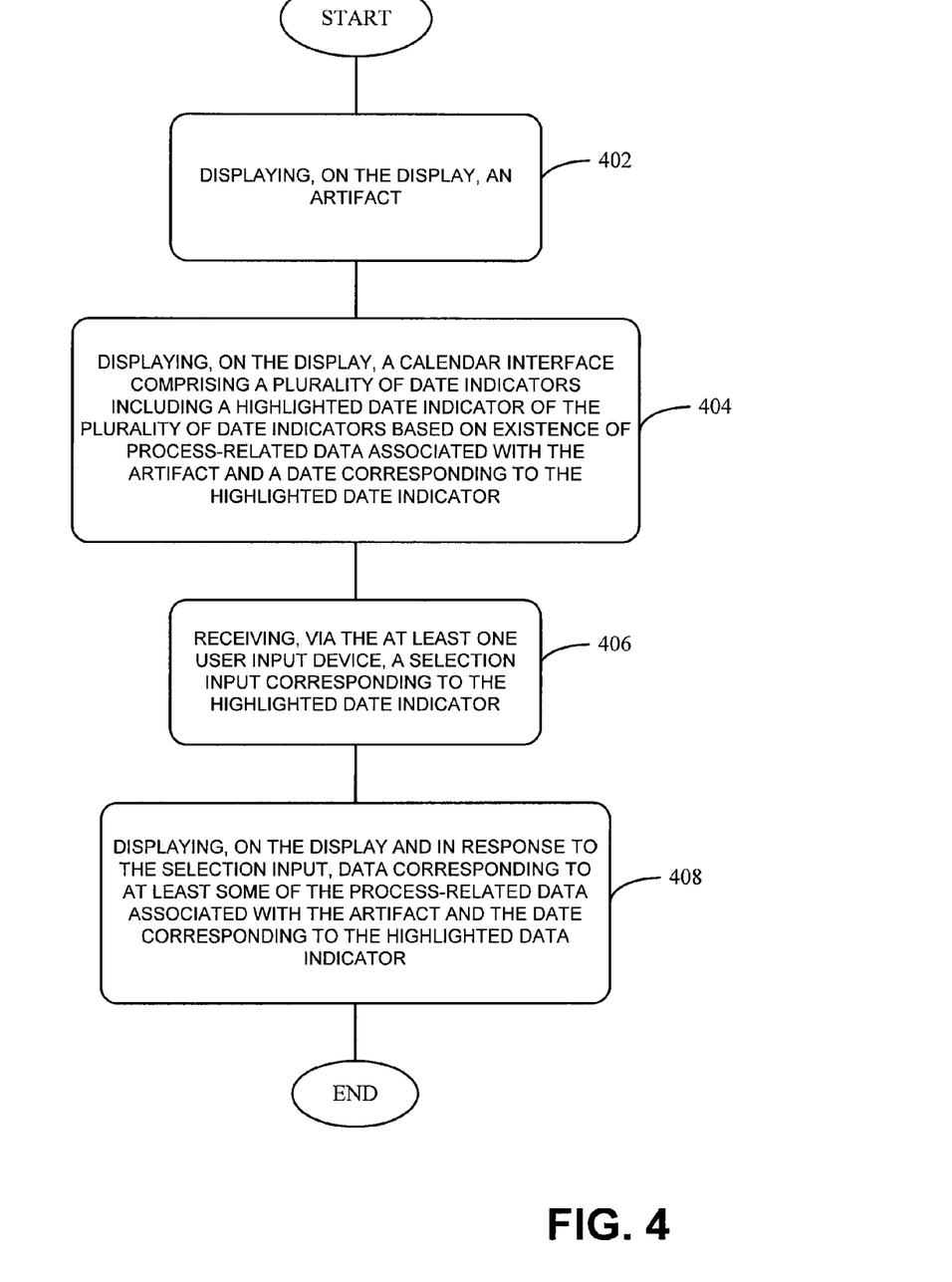
FIG. 4 is a flowchart illustrating a method for establishing process-related context concerning at least one artifact.

The operation of the processing device 200 will be better understood in view of FIG. 3, illustrating an example of an application 302 operating upon an artifact 304 on graphical user interface 216, and in view of FIG. 4, illustrating a method for implementing the graphical user interface 216. First, as shown in block 402, the method includes displaying, on the display 214, an artifact 304. Techniques for generating, rendering, and updating display data (i.e., including graphical elements to be displayed on the display 214) are well known in the art and need not be described in further detail here. As shown in FIG. 3, the artifact 304 is opened by the application 302, as known in the art. The application 302 contains, for example, a title bar 306 and any other common components known in the art but not shown in FIG. 3, such as a menu bar, status bar, or any other suitable components typically dependent upon the nature of the application 302. In this particular example, the artifact 304 is a spreadsheet containing rows 1 through 11 and columns A through D. The various cells (comprised of a column/row pair, such as cell B2, as commonly known in the art) may contain any suitable information. For example, cell A2 contains the text "Title:" and the adjacent cell B2 contains the title text "Example 1." In this example, cell B5 is the selected cell, i.e., it has the current focus, as indicated by the bolded border of the cell.

A process-related data management tool 308 is also displayed on the graphical user interface 216. As shown in block 404, the method includes displaying, on the display 214, a calendar interface 310. The calendar interface is part of the process-related data management tool 308. The process-related data management tool 308 may also include a task interface 312 and a media capture interface 314, discussed in more detail below. The calendar interface 310 includes a plurality of date indicators, generally referenced as 316 but shown as numbers 1-30 in this particular example which correspond to the days of the month of April 2008. It is understood that any suitable date indicators may be used, however. Some of the date indicators of the calendar interface 310 are highlighted date indicators 318, such as the date indicators corresponding to the 8th, 17th, and 30th days of the month of April. It is understood that "highlighted" means any type of indicia that differentiates the highlighted date indicators. For example, highlighted may mean underlined, bolded, displayed in a different color, or any other suitable highlighting means or method known in the art.

A highlighted date indicator 318 indicates the existence of process-related data associated with the artifact 304 and a date corresponding to the highlighted date indicator. Thus, in this particular example, process-related data is associated with the artifact and the dates of Apr. 8, 17, and 30, 2008. For example, a person may have previously associated information with artifact 304 instructing a person to update the artifact 304. It is also contemplated that the highlighted date indicators may not just correspond to artifact 304 but may more specifically indicate that process-related data is associated with a portion of the artifact 304 that has focus. In this example, the selected cell B5 is the portion of the artifact 304 that has focus, but any suitable (i.e., selectable) subcomponent of the artifact may be used as a base subcomponent, such as a row, a column, a sheet, etc. As a further example, in the case of a word processing document artifact, a subcomponent may be a paragraph or a page. Other suitable subcomponents of artifacts, dependent upon the type of application used to operate upon the artifacts, will be recognized by one having ordinary skill in the art. It is understood that while the process-related data may be selected based on a selected portion of an artifact (e.g., a cell, a paragraph, a slide), the selected process-related data may be selected based on any other suitable criteria, such as the date, the artifact as a whole, keywords, or any other suitable criteria.

Figure 5:
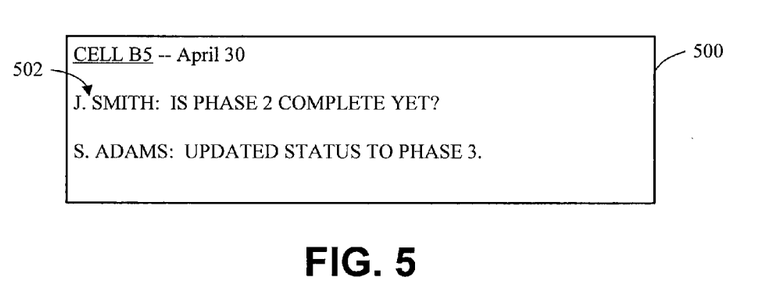
FIG. 5 shows an illustration of an example of a graphical user interface comprising data corresponding to at least some process-related data associated with an artifact.

As shown in block 406, the method includes receiving, via the at least one user input device 212, a selection input corresponding to the highlighted date indicator 318. For example, a user may use a mouse to click on the highlighted date of April 30. In response thereto, as shown in block 408, the method includes displaying, on the display 214 and in response to the selection input received from the at least one user input device 212, data corresponding to at least some of the process-related data associated with the artifact 304 and the date corresponding to the highlighted date indicator. For example, as shown in FIG. 5, a portion of a graphical user interface (in the form of, for example, a popup window 500) may be displayed, which contains the data 502 corresponding to at least some of the process-related data associated with the artifact 304 and the date corresponding to the highlighted date indicator (April 30). In this particular example, the process and context for which the cell's information was changed can be seen. J. Smith asked, "Is Phase 2 complete yet?" To this, S. Adams noted, "Updated status to Phase 3." Even if S. Adams did not make this note but instead simply updated cell B5 to "Phase 3," the context in which this change was made would be evident in view of the process-related data whereby J. Smith inquired about whether Phase 2 is complete yet. While the actual change of the value in cell B5 may be tracked via history data, the process/context (i.e., the reason for the change) was stored as process-related data. As such, the displaying of the data corresponding to the at least some of the process-related data may further include displaying a most current change made to the selected portion of the date. For example, although not shown in FIG. 5, S. Adams' note about updating the status to Phase 3 could also indicate that "Phase 2" (not shown) was deleted and replaced with "Phase 3."

In one embodiment, the process related data is captured by building plug-ins (i.e., extensions) to the applications that can capture the actions on the artifact. In the case of Microsoft Excel, an example of a spreadsheet application, a programmer may use Microsoft Visual Studio Tools to create the plug-in.

A plug-in taking the form of the calendar interface 310, for example, may listen to events within the application 302 and capture the events and send them to the storage element 106. For example, if a cell in a spreadsheet is changed, an event is triggered in the application 302, as known in the art. The calendar interface 310 may trap this event and capture the change.

For the task interface 312 and the media capture interface 314, the interfaces 312 and 314 may be shown as a sidebar, as known in the art, in the application 302, and the sidebar may receive user input to allow users to add content. It is noted that each interface, i.e., the calendar interface 310, the task interface 312, and the media capture interface 314, may independently store the process-related data associated therewith. In other words, process-related data displayed in the calendar interface 310 may be stored in a different file than process-related data associated with the task interface 312 or the media capture interface 314.

It is further contemplated that when displaying the data corresponding to the at least some of the process-related data, a history for the artifact up to the selected date may also be displayed. Thus, a user may be able to view the process-related data indicating the context in which changes were made (e.g., another user may have instructed somebody to update something or questioned whether something should be updated), and the changes made in response thereto, up to the selected date, may be displayed. Thus, a person reviewing an artifact will better understand not only what was changed but the context in which it was changed. As such, a user may, for example, be able to anticipate the next required revisions based not only on the previous changes, but also on the context in which those changes were made.

To further elaborate on this example, an additional optional step of the method includes receiving change data for the artifact via the at least one user input device 212. In the example described above, user J. Smith used a user input device 212, such as a keyboard, to enter the process-related comment/question asking if Phase 2 was complete yet. This change data was then stored on a storage element 106 (received from the process-related data handling component 102 that received the change data from the management component 108 that, in turn, received the change data from the API of the application 104) and was associated with the current date, at that time, to provide updated process-related data. If this was the first process-related data associated with Apr. 30, 2008, then the calendar interface, after the user provided the change data, would be re-displayed based on the updated process-related data, to now show the date indicator of April 30 to be highlighted, thereby indicating that, for this artifact, April 30 now has process-related data associated therewith.

The method may also include receiving the process-related data from a storage element 106 at any suitable time. For example, the process-related data management tool 308 may receive the process-related data from a storage element 106 upon invocation of the artifact 304, i.e., loading of a file (such as the artifact 304) by the application 302. It is understood, however, that the process-related data may be received at any suitable time, not just upon invocation (loading) of the artifact 304. For example, the process-related data management tool 308 may receive the process-related data in response to a user selecting a highlighted date indicator with the user input device 212. In this manner, the initial invocation of the artifact 304 may be made more efficient by avoiding the need to obtain all of the process-related data initially in favor of obtaining only a portion of the available process-related data for the artifact 304 when it is requested. It is also noted that the process-related data management tool 308 retrieves the process-related data corresponding to the artifact 304 based on any suitable link therebetween. For example, the artifact 304 may contain an embedded link that corresponds to a location on the storage element 106 where the process-related data corresponding to the particular artifact is located or otherwise indicates a reference suitable for locating the process-related data.

The process-related data may be stored on the storage element 106 in any suitable format. In one embodiment, the process-related data is stored in plain text files, separate from the artifact, with carriage returns acting as separating indicators to separate the process-related data stored therein. The plain text file storing process-related may be viewed as a log of every process-related operation associated with an artifact. The data within the plain text file may then be parsed, by a data management tool, for example, and utilized to provide process context to a user. It is understood, however, that the process-related data may be stored in any suitable format, such as, for example, in an XML file or in a database.

It is further understood that the process-related data management tool 308 may also display a task interface 312 having a list of tasks associated with a selected portion of the artifact 304. As shown in FIG. 3, for example, cell B5 is the selected portion of artifact 304, and the list of tasks 320 includes two tasks, namely "Task 1" and "Task 2." The task interface 312 may include any suitable buttons, such as, for example, a new button 322 to create a new task associated with the selected portion of the artifact 304, a delete button 324 to delete a task associated with the selected portion of the artifact 304, and/or a complete button 326 to mark a task associated with the selected portion of the artifact 304 as complete. A user may use user input device 212 to give input corresponding to at least one task in the list of tasks 320, and when received by the task interface 312, process-related data is updated based on the input. For example, a user may mark a task as complete, edit the task's caption, provide additional information relating to the task, assign a task to a particular user, or perform any other function known in the art commonly associated with task lists. In this case, however, the task list 320 and the items thereon are associated with process-related data for an artifact 304. In one embodiment, a task is automatically associated with the date or dates on which the task was created and/or revised. For example, when a user creates a task in the task interface 312, the task interface 312 automatically captures the date on which the task is created and includes the date as part of the process-related data.

Another example of a component of a process-related data management tool 308 is a media capture interface 314. Using the media capture interface 314, any of the above-described methods may include displaying the media capture interface 314 and receiving, via the at least one user input device 212 and the media capture interface 314, input (e.g., audio/voice data, screen capture data, video data, or any other suitable audio or visual data) associated with the artifact. Upon receiving the input, the process-related data may be updated in response thereto. For example, the media capture interface 314 contains a list 326 of media files associated with either the artifact 304 in general and/or the selected portion of the artifact (cell B5 in this example). The media files may be in any suitable format and may contain any suitable form of media, such as video recording a person, video recording screen captures, a series of stills representing screen captures, audio, etc. The media capture interface also includes any suitable buttons, such as start button 328, stop button 330, and delete button 332, which may be used, using known techniques, to control the capture of media. A media file may be played back, for example, by clicking on one of the captions (e.g., "Video 1") in the list 326 of media files.

As one skilled in the art will appreciate, the media capture module 314 allows a user to capture the context/process for creating and/or revising artifacts in the form of audio and/or visual forms. As such, for example, a user may conveniently record his or her thoughts with respect to an artifact or particular subcomponent thereof (e.g., a cell, paragraph, etc.), and then another user may use that process-related data to understand the context of changes that have been made or that are desired.

Figure 6:
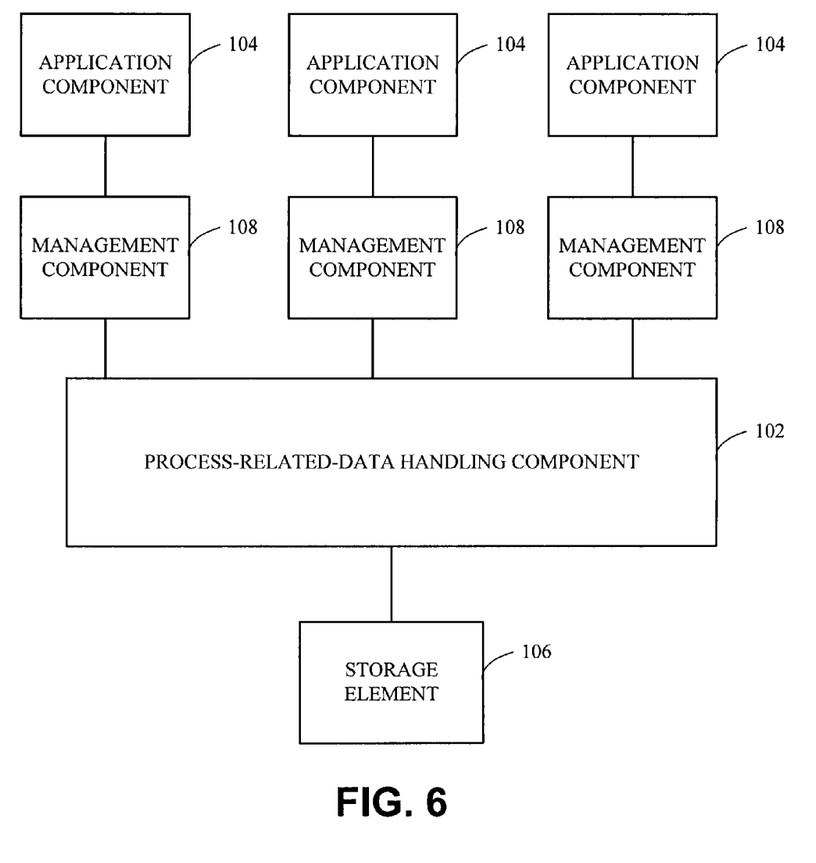
FIG. 6 is a block diagram illustrating the relationship between multiple application components, a process-related-data handling component, and a storage element.
Figure 7:
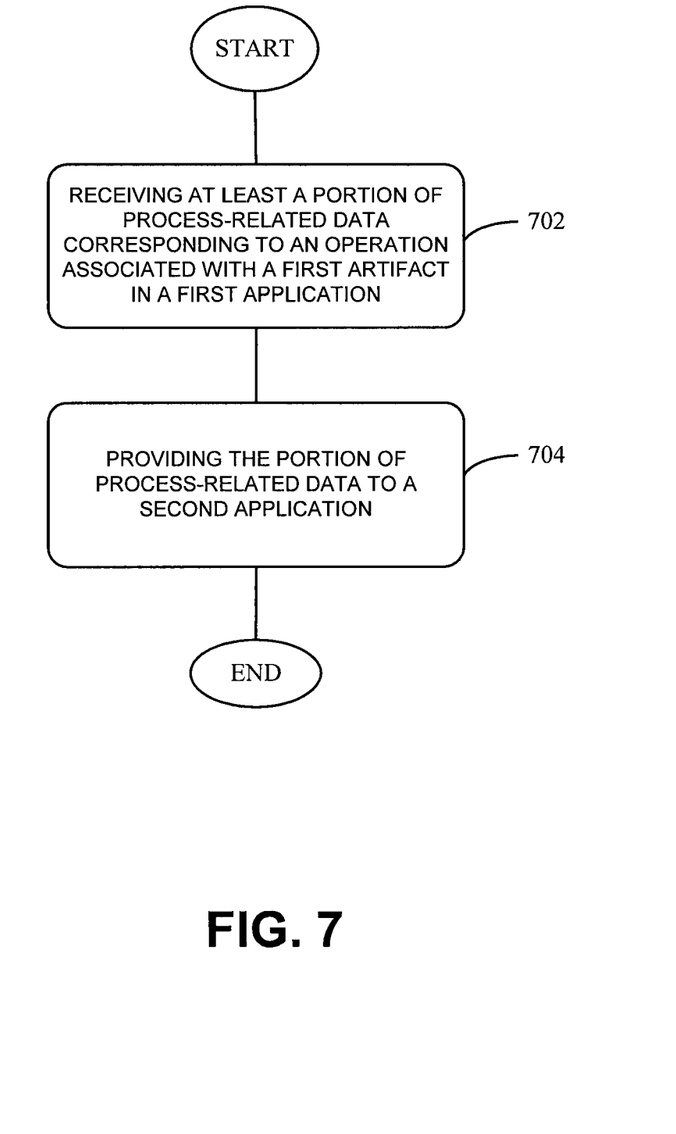
FIG. 7 is a flowchart illustrating a method for establishing process-related context concerning at least one artifact.

Turning now to FIG. 6, a block diagram is shown that further illustrates the relationship between multiple instances of the application and management components 104, 108 and the process-related-data handling component 102 and the storage element 106. FIG. 7 also illustrates an example method for establishing process-related context concerning at least one artifact that may be implemented by any suitable device, such as device 200. As shown in block 702, a method includes receiving at least a portion of process-related data corresponding to an operation associated with a first artifact in a first application 104. For example, the process-related-data handling component 102 may receive the at least a portion of process-related data corresponding to an operation associated with the first artifact in the first application 104.

The first application may be any suitable application for creating and/or revising an artifact, such as a word processing application, a spreadsheet application, or a presentation-creating application, for example. As shown in FIG. 6, several application components 104 are operatively coupled to a process-related-data handling component 102 via management components 108. Each application component 104 may be on one computer or may be distributed across multiple computers having different users. The process-related-data handling component 102 may also be distributed or implemented across any suitable number of machines.

As shown in block 704, the method further includes providing the portion of process-related data to a second application 104. The second application 104 may be the same type of application as the first application 104, may be a different artifact creating/revising application, or may be any other suitable applications, such as, for example, a newsfeed reader. It should be noted that the second application may be provided with the portion of process-related data by retrieving it from the storage element 106 via the process-related-data handling module. The method may further include displaying, on a display 214, data corresponding to the at least a portion of process-related data in a process-related data management tool 308 associated with the second application.

In the case of the second application being a newsfeed reader, as known in the art, a user may view the process-related data in the form of a newsfeed. As such, for example, the user may gain an understanding of the context of the creation and/or revision of artifacts without needing to actually access or open the artifact. Furthermore, a user may be provided with updated process-related data as soon as it is available so that, for example, the user may provide guidance if he or she sees the context of the creation or revision of a document going astray from a desired direction. As those having ordinary skill in the art will appreciate, other methods of obtaining subscription-based access (such as a newsfeed) to process-related data for specific artifacts (for example, all of the artifacts related to a given work project) may be equally employed. For example, instead of a "push" model, where the process-related data is automatically sent to a subscriber, a "pull" model may be employed where the subscriber may request updates to process-related data for the artifacts to which he/she is subscribed.

While particular embodiments have been shown and described, it will be obvious to those skilled in the art that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A system comprising:
an application component, implemented by at least one processing device, operative to revise content of an electronic document, the content including at least one subcomponent;
a process-related-data handling component, implemented by at the least one processing device, operatively coupled to the application component and operative to capture user-input process-related data corresponding to a revision to the at least one subcomponent of the content of the electronic document via a process-related data management tool, wherein the process-related data including reasoning for the revision to the electronic document and wherein the process-related data management tool is a calendar interface comprising a plurality of date indicators including a highlighted date indicator of the plurality of date indicators based on a portion of process-related data;

a storage element operatively coupled to the process-related-data handling component and operative to store the process-related data; and a management component, implemented by the at least one processing device, operatively coupled to the process-related data handling component, the application component, and the storage element, and operative to concurrently show, on a display, the electronic document and the process related data management tool.

2. The system of claim 1 wherein the management component is operative to retrieve at least the portion of the process-related data from the storage element.

3. The system of claim 2 wherein the management component is further operative to send at least another portion of the process-related data to the application component.

4. The system of claim 2 wherein the management component is further operative to retrieve at least a portion of the process-related data from the application component.

5. The system of claim 4 wherein the process-related-data handling component is operative to receive the portion of the process-related data from the management component and is further operative to provide the portion of the process-related data to a second application component.

6. The system of claim 1 wherein the process-related data includes selectable criteria.

7. The system of claim 6 wherein the selectable criteria includes a date and the at least one subcomponent.

8. The system of claim 6 wherein the process-related data handling component is further operative to display, on the display, data providing process-related context based on a selection of at least one selectable criteria.

9. The system of claim 1 wherein the process-related data handling component is further operative to filter process-related data based on selectable criteria.

10. The system of claim 1 wherein the process-related data handling component is further operative to display the process-related data corresponding to a revision to the at least one subcomponent of the content of the electronic document based on a selection of the at least one subcomponent of the content of the electronic document.

11. In a processing device implementing one or more electronic document processing applications and having a graphical user interface including a display and at least one user input device, a method for establishing process-related context concerning at least one electronic document, the method comprising:

displaying, on the display, an electronic document via the one or more electronic document processing applications, wherein the one or more electronic document processing applications are operative to revise content of an electronic document, the content including at least one subcomponent;

displaying, on the display concurrently with the electronic document, a calendar interface comprising a plurality of date indicators including a highlighted date indicator of the plurality of date indicators based on existence of user-input process-related data associated with a revision to the at least one subcomponent of the content of the electronic document and a date corresponding to the highlighted date indicator;

receiving, via the at least one user input device, a selection input corresponding to the highlighted date indicator; and displaying, on the display and in response to the selection input, data corresponding to at least some of the process-related data and the date corresponding to the highlighted date indicator.

12. The method of claim 11 further comprising:
receiving the process-related data from a storage element upon invocation of the electronic document.

13. The method of claim 11 further comprising:
receiving change data for the content of the electronic document via the at least one user input device;
storing the change data on a storage element as associated with a current date to provide updated process-related data; and
re-displaying the calendar interface based on the updated process-related data.

14. The method of claim 11 further comprising:
selecting the at least some of the process-related data based on a selected selection of the at least one subcomponent of the content of the electronic document to create a selected subcomponent.

15. The method of claim 14 wherein displaying the data corresponding to the at least some of the process-related data further comprises displaying a most current revision made to the selected subcomponent on the date.

16. The method of claim 11 wherein displaying the data corresponding to the at least some of the process-related data further comprises displaying a history of revision to the content off the electronic document up to the date.

17. The method of claim 11 further comprising:
displaying a task interface having a list of tasks associated with a selected subcomponent of the electronic document;
receiving, via the at least one user input device, input corresponding to at least one task in the list of tasks; and
updating the process-related data based on the input.

18. The method of claim 11 further comprising:
displaying a media capture interface;
receiving, via the at least one user input device and the media capture interface, additional user-input process-related data associated with the electronic document; and
updating the process-related data based on the additional user-input process-related data.

19. The method of claim 11 further comprising:
receiving change data for the electronic document via the at least one user input device; and
providing updated process-related data, based on the change data, to an application associated with a second electronic document.

20. A device for establishing process-related context concerning at least one electronic document comprising:
a display;
at least one user input device;
one or more processors; and
at least one storage device thereon having stored executable instructions that, when executed by the one or more processors, cause the one or more processors to:
display, on the display, an electronic document via an electronic document processing application, wherein the electronic document processing application is operative to revise content of an electronic document, the content including at least one subcomponent;
display, on the display concurrently with the electronic document, a calendar interface comprising a plurality of date indicators including a highlighted date indicator of the plurality of date indicators based on existence of user-input process-related data associated with a revision to the at least one subcomponent of the content of the electronic document and a date corresponding to the highlighted date indicator;

receive, via the at least one user input device, a selection input corresponding to the highlighted date indicator; and display, on the display and in response to the selection input, data corresponding to at least some of the process-related data and the date corresponding to the highlighted data indicator.

21. The device of claim 20, wherein the stored executable instructions, when executed by the one or more processors, further cause the one or more processors to:

receive the process-related data from a storage element upon invocation of the electronic document.

22. The device of claim 20, wherein the stored executable instructions, when executed by the one or more processors, further cause the one or more processors to:

receive change data for the electronic document via the at least one user input device;

store the change data on a storage element as associated with a current date to provide updated process-related data; and re-display the calendar interface based on the updated process-related data.

23. The device of claim 20, wherein the stored executable instructions, when executed by the one or more processors, further cause the one or more processors to:

select the at least some of the process-related data based on a selection of the at least one subcomponent of the content of the electronic document to create a selected subcomponent.

24. The device of claim 23, wherein the stored executable instructions, when executed by the one or more processors, further cause the one or more processors to:

when displaying the data corresponding to the at least some of the process related data, display a most current revision made to the selected subcomponent on the date.

25. The device of claim 20, wherein the stored executable instructions, when executed by the one or more processors, further cause the one or more processors to:

when displaying the data corresponding to the at least some of the process related data, display a history of revision to the content of the electronic document up to the date.

26. The device of claim 20, wherein the stored executable instructions, when executed by the one or more processors, further cause the one or more processors to:

display a task interface having a list of tasks associated with a selected subcomponent of the electronic document;

receive, via the at least one user input device, input corresponding to at least one task in the list of tasks; and update the process-related data based on the input.

27. The device of claim 20, wherein the stored executable instructions, when executed by the one or more processors, further cause the one or more processors to:

display a media capture interface;

receive, via the at least one user input device and the media capture interface, additional user-input process-related data associated with the electronic document; and update the process-related data based on the additional user-input process-related data.

28. The device of claim 20, wherein the stored executable instructions, when executed by the one or more processors, further cause the one or more processors to:

receive change data for the electronic document via the at least one user input device; and provide updated process-related data, based on the change data, to an application associated with a second electronic document.

29. In a processing device implementing one or more electronic document processing applications, a method for establishing process-related context concerning at least one electronic document, the method comprising:

receiving at least a portion of process-related data corresponding to a revision to content of a first electronic document in a first application from a process-related data handling component, the process-related data handling component comprising a process-related data handling tool operative to capture user-input process-related data concerning the revision while being displayed concurrently with the electronic document in the application, wherein the process-related data includes data regarding reasoning for the revision to the content of the electronic document and wherein the process-related data management tool is a calendar interface comprising a plurality of date indicators including a highlighted date indicator of the plurality of date indicators based on the portion of process-related data;

providing the portion of process-related data to a second application.

30. The method of claim 29 further comprising:

displaying, on a display, data corresponding to the at least a portion of process-related data in the process-related data management tool associated with the second application.

31. The method of claim 30 wherein the process-related data management tool is a task interface having a list of tasks associated with at least one of the portion of process-related data.

32. The method of claim 29 wherein the second application is a newsfeed reader.

33. A method for establishing process-related context concerning at least one electronic document, the method comprising:

receiving process related data corresponding to a revision to content of an electronic document in an application operative to create and revise the electronic document from a process-related data handling component, the process-related data handling component comprising a process-related data management tool being operative to capture process-related data concerning the revision while being displayed concurrently with the electronic document in the application, wherein the process-related data includes data regarding reasoning for the revision to the content of the electronic document and wherein the process-related data management tool is a calendar interface comprising a plurality of date indicators including a highlighted date indicator of the plurality of date indicators based on a portion of process-related data; and sending the process-related data to a storage element.

* * * * *